Nov. 4, 1924. 1,513,863
H. B. SABIN
TRUCK
Filed Feb. 27, 1922 2 Sheets-Sheet 2
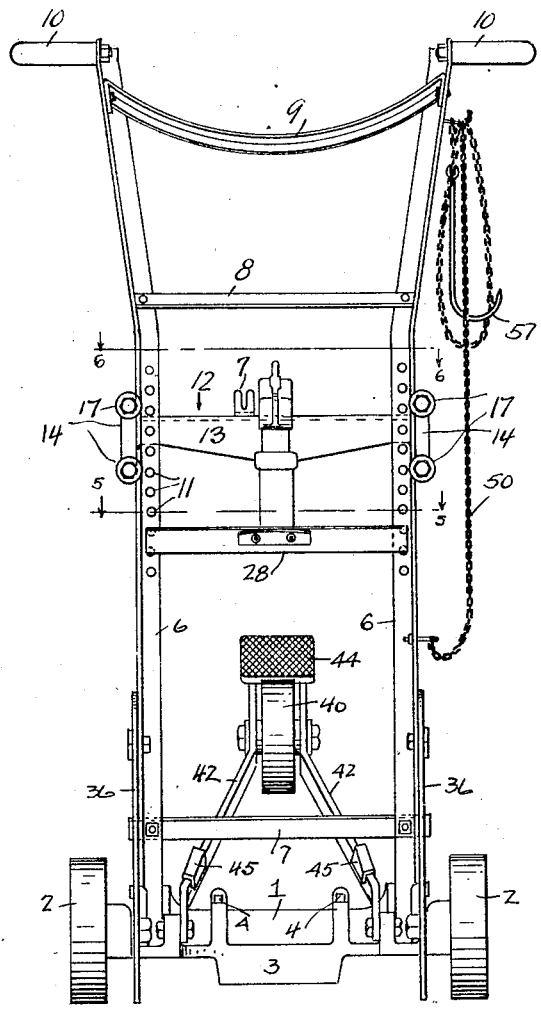
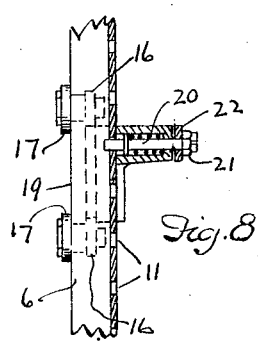
INVENTOR.
Herbert B. Sabin
BY
Fay, Oberlin & Fay
ATTORNEYS Patented Nov. 4, 1924.

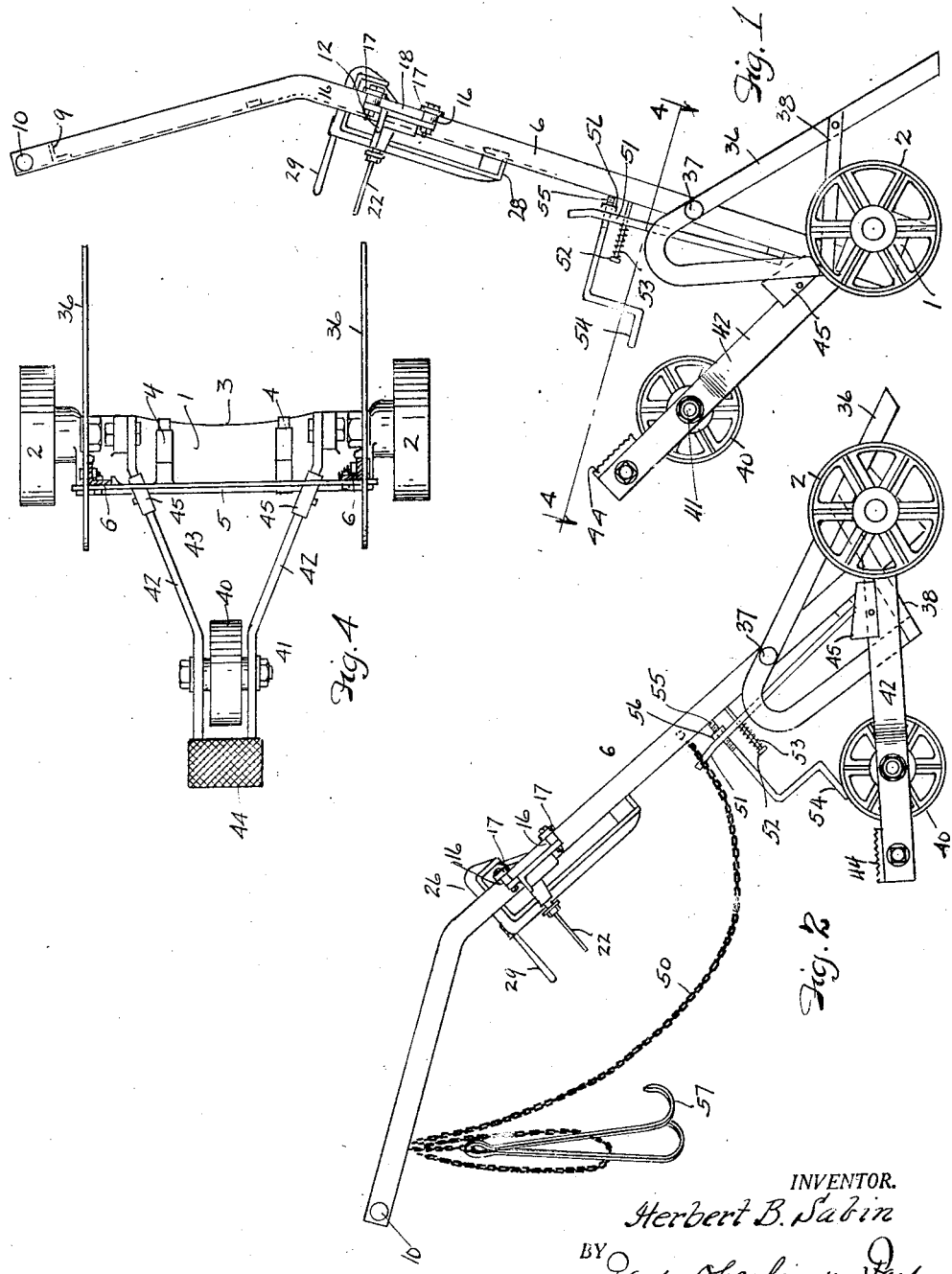

1,513,863

UNITED STATES PATENT OFFICE.

HERBERT B. SABIN, OF CLEVELAND HEIGHTS, OHIO.

TRUCK.

Application filed February 27, 1922. Serial No. 539,470.

*To all whom it may concern:*

Be it known that I, HERBERT B. SABIN, a citizen of the United States, and a resident of Cleveland Heights, county of Cuyahoga, and State of Ohio, have invented a new and useful Improvement in Trucks, of which the following is a specification, the principle of the invention being herein explained and the best mode in which I have contemplated applying that principle, so as to distinguish it from other inventions.

The present invention relates to hand operated trucks of the type generally used to handle metal containers, boxes, or barrels, and the present truck relates more particularly, to the type shown in my issued United States Letters Patent No. 1,358,881, and those shown in my United States Letters Patent No. 1,438,334.

The present type of truck is adapted to be moved adjacent the container or other package to be moved, and to engage with the same so that the container may be lifted by tilting the truck rearwardly. The container is not lifted from the bottom but is lifted by holding the container against suitable engaging means on the truck and thus the container does not have to be moved or tilted by hand to engage the truck therewith, but may be handled and moved expeditiously. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is a side elevational view of my truck shown in the position which the truck takes in engaging a container; Fig. 2 is a similar side elevation but showing the truck in a position which it assumes when the container is tilted and the truck is used to move the container; Fig. 3 is a front elevational view of the truck standing in the position shown in Fig. 1; Fig. 4 is a sectional view on the line 4—4 of Fig. 1; Fig. 5 is a sectional view on the line 5—5 of Fig. 3; Fig. 6 is a sectional view on the line 6—6 of Fig. 3; Fig. 7 is a sectional view on the line 7—7 of Fig. 6; and Fig. 8 is a sectional view on the line 8—8 of Fig. 6.

The present truck is a modified form of the trucks shown in my issued patents previously mentioned, but the present truck has been modified and changed in order to make it applicable to larger loads and to various types of containers, and embodies certain changes and improvements over the earlier types.

As shown, the truck embodies a base member 1 in which are journaled suitable wheels 2, and this base member is provided with a curved seat 3 to receive the container or barrel and also with two projected lugs or studs 4 which are adapted to engage with a wooden barrel or box so as to prevent the same from slipping when the truck is tilted. Attached to this base member is a frame work 5 consisting of two upwardly extending angle sections 6 which are preferably connected by a cross bar 7 near the bottom, and by a second cross member 8 near the upper end. At approximately the height of this second cross member the two frame members are bent outwardly as best shown in Fig. 3, and are connected at their upper ends by means of a third angle iron or cross member 9. Handles 10 are provided, and these handles are connected to the outside of the frame members so that the operator can stand between the upper portion of the frame members in operating the truck. These frame members are also bent backwardly as best shown in Figs. 1 and 2, at approximately the same point they start to spread apart, and this backward bend is made in order to allow the truck to properly balance at the point where the operator will naturally hold the handles.

The straight portions of the frame members are provided with a series of spaced aligned apertures 11 and a lifting cross bar 12 is slidably mounted on the frame members and is provided with means for engagement with these apertures. This cross bar as best shown in Figs. 3, 6 and 8, comprises the cross member 13 proper which has shouldered flanges 14 at its ends and these flanges engage with the outer faces 15 of the frame members and are provided with double rollers, 16 and 17, one of the rollers 16 contacting with the surface 18 of the frame member, and the other roller 17 being of greater diameter and engaging over the edge 19 of the frame member. As shown, there are two such pairs of rollers on each side so as to keep the cross member accurately aligned and to allow it to be moved easily up and down the frame members to which it may be secured at various positions.

The holding mechanism for this cross member consists of two pins 20 movably mounted through the member and these pins are provided with heads 21 which are engaged over two pivoted angle members 22 so arranged as to be gripped by the hand of the operator to withdraw the pins. The handles as shown in Figs. 1 and 2, extend at right angles to the frame member so that they may be used to move the cross member up and down the frame, as well as to control the action of the movable pins. Mounted through a suitable slot 25 in the adjustable cross member, is a separately movable hook member 26 which has a downwardly extending portion 27 attached at its lower end to a second movable cross member 28 and this second cross member is merely an angle iron which is notched at its ends to slide on the frame members and to maintain the hook in alignment. This hook or clamping member is provided with a handle 29 so that it may be raised and forced down over the edge of the container without changing the position of the cross bar 12.

In the present truck the lifting member 30 has been made adjustable toward and from the container, and as best shown in Fig. 7, the lifting member 30 comprises a pivoted plate 31 with a relatively sharp upper edge 32, the plate being mounted within a curved portion 33 formed on the cross member, the forward face 34 of this curved portion acting to limit forward movement of the pivoted lifting member. This member is normally maintained in its forward position by means of a small spring 35 held in suitable holes in the cross member and the pivoted member. The slidable cross-bar 12, the relatively movable clamping hook 26, and the pivoted lifting member 30, with their necessary adjusting means, comprise the means for clamping and lifting the container.

At the base of the truck are pivotally mounted legs or stands 36, comprised of metal bars which are pivotally attached to the frame by means of bolts or pins 37, and these bars are re-curved as best shown in Figs. 1 and 2, and the re-curved portion is connected to the front portion or leg by means of a strap 38. These legs are free to pivot slightly and, as shown in Fig. 1, will move in front of the truck so as to maintain it in a vertical upright position but when the truck is not used, but they drop down or toward the wheels of the truck and assume the position shown in Fig. 2, where they are out of the way when the container is being handled.

To aid in lifting heavy containers such as large sized oil drums or barrels, the present truck is provided with a third wheel 40 which is mounted on a shaft 41 held in two rearwardly extending side members 42 of a triangular frame 43. These members extend rearwardly behind the wheel and are provided with a pedal 44 so that the operator can use this pedal as a foot leverage in tilting the truck. This rear wheel frame is pivotally attached to the base of the truck but has only limited movement relative to the truck frame, and this limited movement allows the truck after it has been tilted, to be brought to rest upon two blocks 45 which are attached to the side members 42 of the third wheel, the lower cross member being the portion of the truck which contacts with and rests upon these two blocks. The blocks are adjustably mounted upon the side members and thus the final tilted position of the truck can be set so that the position of the handles will be correct for any particular operator.

In addition to the clamping and lifting mechanism heretofore described, the truck is also provided with a chain 50 so that the wooden barrels or the like, can be lifted and handled. As shown, this chain is attached to one of the upright frame members and on the other side there is a notched bar 51 which is adjustably mounted and to which the chain may be attached. When a wooden barrel is to be lifted, the truck is forced adjacent the barrel and then the chain is looped around the barrel and secured in the notched bar. As shown in Figs. 1 and 2, this bar is provided with a pin 52 carrying a spring 53 which normally holds the bar close to the frame member. To move the bar backwardly from the frame member, a handle 54 is rotatably mounted in the bar and contacts the frame member. This handle has a threaded end 55 which is in engagement with a threaded nut or boss 56 fixed on the bar so that by rotation of the handle, the bar is moved backwardly to tighten the chain around the barrel.

The operation of the present truck is in general, similar to the operation of my previous types of trucks but here the truck can be used with barrels or containers of varying heights, it merely being necessary to change the normal position of the lifting cross member and then the hook, and to set the same at such a height that the hook will fit over the upper edge of the container. The thickness of the upper edge or flange of the container or barrel, is automatically compensated for by the spring pressed lifting member, and this member has a sharp edge so that it will engage under any small upper chime ring or outwardly extended portion of the container and thus metal containers of practically all types may be lifted by tilting the truck backwardly and will be held suspended by their upper extended edge whatever its form. The operation of handling a wooden barrel has been heretofore described and where a box or the like is desired to be lifted, the hooks 57 on the chain are adapted to be engaged over the box so as to hold it snugly on the truck. The use of the third wheel and its pivotally attached frame, allows a heavy container to be tilted and then the container will be brought to rest on the three wheels and in such a position that the handles will be at the normal height for the truck operator. As the relative angle between the truck frame and the frame for the third wheel may be set, it is possible to vary the normal height of the handle.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a truck for metal containers and the like, the combination of a frame adapted to receive the container and provided with traction wheels, clamping and lifting means adjustably and slidably mounted on said frame and adapted to engage with the upper extended edge of the container to secure the same on said frame whereby the container may be lifted by tilting said truck, and means for moving said clamping means along said frame and for securing the same in position.

2. In a truck for metal containers and the like, the combination of a frame adapted to receive the container and provided with traction wheels, a cross member slidably mounted on said frame, means for moving and securing said cross member to said frame, and clamping and lifting means mounted on said cross member and adapted to engage with the upper extended edge of the container to secure the same to said frame whereby the container may be lifted by tilting said truck.

3. In a truck for metal containers and the like, the combination of a base member having traction wheels, two upwardly extending frame members, a cross member slidably mounted on said frame members, means for moving and securing said cross member in position and clamping and lifting means carried by said cross member and adapted to engage with the upper extended edge of the container to secure the same to said frame whereby the container may be lifted by tilting said truck.

4. In a truck for metal containers and like, the combination of a base member having traction wheels, two upwardly extending frame members, a cross member slidably mounted on said frame members, means for moving and securing said cross member in position, a lifting member pivotally carried by said cross member and adapted to engage under the upper extended edge of the container and a clamping hook movably carried by said cross member and adapted to be engaged over the upper edge of said container to secure the same in place on said lifting member, whereby the container may be lifted by tilting said truck.

5. In a truck for metal containers and the like, the combination of a frame adapted to receive the container and provided with traction wheels, and clamping and lifting means mounted on said frame and adapted to engage with the upper extended edge of the container to secure the same on said frame whereby the container may be lifted by tilting said truck, said lifting means being automatically compensating for container edges of different thicknesses.

6. In a truck for metal containers and the like, the combination of a frame adapted to receive the container and provided with traction wheels, and clamping means mounted on said frame and adapted to engage with the upper extended edge of the container to secure the same on said frame whereby the container may be lifted by tilting said truck, said clamping means including a pivoted lifting member resiliently pressed away from said frame, and a movable hook member adapted to fit over the upper edge of the container to maintain the lifting member in position.

7. In a truck for metal containers and the like, the combination of a frame adapted to receive the container and provided with traction wheels, and clamping means mounted on said frame and adapted to engage with the upper extending edge of the container to secure the same on said frame whereby the container may be lifted by tilting said truck, said clamping means including a cross member adjustably and movably mounted on said frame, a lifting member pivotally attached to said cross member and provided with a sharp upper edge for engagement with the upper extended edge of the container, resilient means for normally forcing said lifting member away from said frame, and a hook member adapted to fit over the edge of the container to maintain said container and lifting member in lifting relation.

8. In a truck for metal containers and the like, the combination of a frame adapted to receive the container and provided with traction wheels, clamping means adjustably and slidably mounted on said frame and adapted to engage with the upper extended edge of the container to secure the same on said frame whereby the container may be lifted by tilting said truck, and means for moving said clamping means along said frame and for securing the same in adjusted positions, and an auxiliary frame pivotally attached to said main frame and having a third traction wheel, said frame and wheel being adapted to hold the truck and container when said truck is tilted to lift said container.

9. In a truck for metal containers and the like, the combination of a frame adapted to receive the container and provided with traction wheels, clamping means adjustably and slidably mounted on said frame and adapted to engage with the upper extended edge of the container to secure the same on said frame whereby the container may be lifted by tilting said truck, means for moving said clamping means along said frame and for securing the same in adjusted positions, and an auxiliary frame having a wheel, pivotally attached to said main frame and extending rearwardly therefrom, said frame being adapted to allow said truck to rest thereupon when said truck is tilted through a predetermined angle to carry the load.

10. In a truck for metal containers and the like, the combination of a frame adapted to receive the container and provided with traction wheels, clamping means adjustably and slidably mounted on said frame and adapted to engage with the upper extended edge of the container to secure the same on said frame whereby the container may be lifted by tilting said truck, means for moving said clamping means along said frame and for securing the same in adjusted positions, and an auxiliary frame having a wheel, pivotally attached to said main frame and extending rearwardly therefrom, said frame being provided with adjustable blocks for engagement with the main frame to support the latter and the container upon tilting through a predetermined angle.

11. In a truck for metal containers and the like, the combination of a frame adapted to receive the container and provided with traction wheels, clamping means adjustably mounted on said frame and adapted to engage with the upper extended edge of the container to secure the same on said frame whereby the container may be lifted by tilting said truck, means for moving said clamping means along said frame and for securing the same in adjusted positions, and an auxiliary frame having a wheel, pivotally attached to said main frame extending rearwardly therefrom, said frame being provided with adjustable blocks for engagement with the main frame to support the latter and the container upon tilting through a predetermined angle, said frame having a pedal portion adapted to be used as a foot lever to aid in tilting said truck.

12. In a truck for metal containers and the like, the combination of base member having wheels, two angle iron frame members extending upwardly therefrom and provided with a cross member near their upper ends, said frame members being provided with spaced aligned apertures, a cross member slidably mounted on said frame member and provided with pins adapted to engage in such apertures to secure said cross member in adjusted positions, and handles on said cross member and connected to said pins whereby movement of said handles will retract said pins to allow said slidable cross member to be moved to the desired position.

13. In a truck for metal containers and the like, the combination of base member having wheels, two angle iron frame members extending upwardly therefrom and provided with a cross member near their upper ends, said frame members being provided with spaced aligned apertures, a cross member slidably mounted on said frame member, said cross member having rollers at its ends adapted to run on said frame members and provided with retractible pins adapted to engage in such apertures, means for retracting said pins to allow said cross member to be adjusted, and clamping and lifting means carried by said cross member and adapted for engagement with a container.

Signed by me, this 21st day of February, 1922.

HERBERT B. SABIN.